United States Patent Office 3,560,511
Patented Feb. 2, 1971

3,560,511
TOPICAL ANAESTHETIC PIPERIDYL CARBINOL
Luigi Bernardi, Via Pinerolo 30, and Cesare Bertazzoli, V. le Caterina de Forli 16, both of Milan, Italy, and Dario Ghiringhelli, Via Caprano, Angera (Varese), Italy
No Drawing. Continuation-in-part of application Ser. No. 612,801, Jan. 31, 1967. This application Dec. 24, 1968, Ser. No. 786,738
Claims priority, application Italy, Dec. 29, 1967, 24,494A/67
Int. Cl. C07d 29/24
U.S. Cl. 260—294.3      2 Claims

ABSTRACT OF THE DISCLOSURE

Disclosed is diphenylacetate of 1,α,α-trimethyl-2-piperidylcarbinol and the process for the preparation thereof from α,α-dimethyl-2-piperidylcarbinol, which is first hydrogenated to the corresponding piperidylcarbinol, treating this compound with formaldehyde and hydrogen in the presence of a suitable catalyst, and esterifying the product to form the diphenylacetate. The product is useful as a topical anaesthetic. 1,α,α-trimethyl-2-piperidylcarbinol prepared as above is a racemic base which may be further separated into the two optical antipodes, the D(+) form of which has been found to have a higher local anaesthetic activity and a lower toxicity than the corresponding base. Either the racemic base or its two optical antipodes can be reacted with the conventional acids for forming pharmaceutically acceptable acid addition salts.

---

This is a continuation-in-part of application Ser. No. 612,801, filed Jan. 31, 1967, now abandoned and related to a new topical anaesthetic 1,α,α-trimethyl-2-piperidylcarbinol, its therapeutically useful acid addition salts and the process for the preparation thereof.

The present invention relates to a new 2-piperidylcarbinol and its optical antipodes useful as topical anaesthetic and to a process for preparing them.

The present invention has as an object the new compound, diphenylacetate of 1,α,α-trimethyl-2-piperidylcarbinol, its optical antipodes and the process for the preparation thereof from α,α-dimethyl-2-pyridylcarbinol. The latter is first hydrogenated to the corresponding piperidylcarbinol, which is then treated with formaldehyde and hydrogen in the presence of a suitable catalyst. The free base is then separated into the two optical antipodes. The process is illustrated by the following scheme:

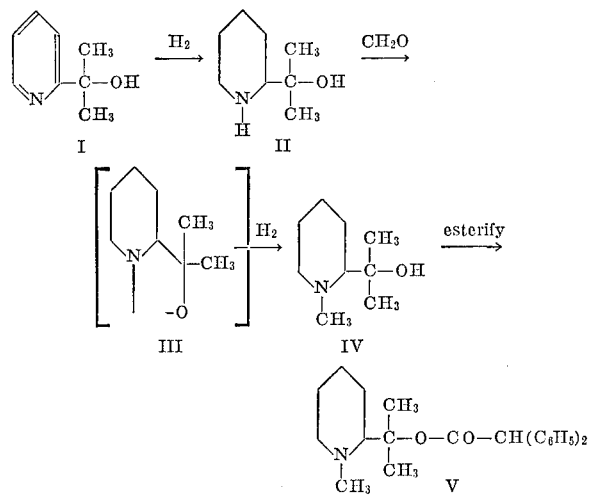

The racemic base of 1,α,α-trimethyl-2-piperidylcarbinol may be further separated into the two optical antipodes, the D(+) form of which has been found to have a higher local anaesthetic activity and a lower toxicity than the corresponding base. The separation of the two optical antipodes can for example be carried out like other chemical separations for example by the separation of the racemic base with tartaric acid.

Either the racemic base or its two optical antipodes can be reacted with the conventional acids for forming the pharmaceutically acceptable acid addition salts. An example thereof are the hydrochlorides.

Other non-toxic pharmaceutically acceptable acid addition salts are sulphates, phosphates, acetates, maleates, ascorbates, succinates, benzoates or salicylates.

The compound of the invention, diphenylacetate of 1,α,α-trimethyl-2-piperidylcarbinol and its optical antipodes, shows an interesting topical anaesthetic activity particularly in comparison to that of Lidocaine (2-diethylamino-2′,6′-aceto-xylidide), which is a most effective product used in the field. It has been demonstrated that at the same toxicity level, the compound of the invention possesses a clearly higher anaesthetic activity. Because of its major pharmacological activity, the compound can be classified among those substances capable of blocking the transmission of the nervous centripetal impulses in nervous fibres. Such an activity has been tested by means of the following methods:

(a) Surface anaesthesia: The technique of anaesthesia of the conjunctival mucosa in the guinea-pig based on the disappearance of the corneal reflex. (Chance M.R.A., Lobstein, H., J. Pharmacol exp. Ther., 1944, 82, 203.)

(b) Infiltration anaesthesia: The technique of intradermic anaesthesia in the guinea-pig based on the disappearance of the horripilitation reflex. (Bulbring E., Wajda J.: J. Pharmacol. exp. Ther., 1945, 85, 78.)

(c) Conduction anaesthesia: The technique of truncus anaesthesia of the sciatic nerve in the rat based on the disappearance of the muscular activity of the limb (Shackell L.F., Anesthesia and Analgesia, 1935, 14, 20; Loomis T.A., Spielmeyer R., Yale Y., Biol. Med. 1946, 18, 1965).

In all cases adequate gradual concentrations of the free base and of the two optical antipodes dissolved in a physiological 8.5% sodium chloride solution, were used. Determinations were carried out on a number of animals in order to obtain a statistically valide evaluation of the data. Such evaluation has been carried out by the method of the Probits (Finney D.J., Probit Analysis—1952— Cambridge University Press, London). In Table 1 are the average effective concentrations ($EC_{50}$) of 1,α,α-trimethyl - 2 - piperidylcarbinol diphenylacetate racemic base, D(+) 1,α,α-trimethyl-2-piperidyl-carbinol diphenylacetate and L(−) 1,α,α-trimethyl-2-piperidyl-carbinol diphenylacetate. As a comparison Lidocaine has been used. The average effective concentration ($EC_{50}$) of a substance means the concentration of the product in mg./ml. which reduces the biological reaction to the half.

TABLE 1

| | $EC_{50}$ in mg./ml. | | |
|---|---|---|---|
| Compound | Surface activity (guinea pig) | Infiltration activity (guinea pig) | Conduction activity (rat) |
| D(+)1,α,α-trimethyl-2-piperidyl-carbinol diphenylacetate | 0.60 | 0.50 | 1.10 |
| L(−)1,α,α-trimethyl-2-piperidyl-carbinol diphenylacetate | 0.95 | 0.68 | 1.51 |
| Racemic 1,α,α-trimethyl-2-piperidyl-carbinol diphenylacetate | 0.85 | 0.61 | 1.39 |
| Lidocaine | 23 | 2.05 | 42.37 |

The data in Table 1 show that the activity of D(+) 1,α,α - trimethyl - 2-piperidyl-carbinol diphenylacetate is clearly higher than that of the corresponding racemic base which is in its turn higher than that of Lidocaine.

Acute toxicity has been determined in the albino mouse by a single treatment with gradual doses of the compounds of the invention by endovenous and subcutaneous routes. The calculation of the average lethan dose ($LD_{50}$), i.e. of the quantity of the product necessary to kill 50% of the treated mice, has been carried out by the above-mentioned Probits method. In Table 2 are the values of $LD_{50}$ expressed in mg. of the product per kg. of body weight, obtained by intravenous and subcutaneous administration.

TABLE 2

| Compound | $LD_{50}$, intravenous route (limits) | | $LD_{50}$, subcutaneous route (limits) | |
| --- | --- | --- | --- | --- |
| D(+)1,α,α-trimethyl-2-piperidyl-carbinol diphenylacetate | 34.1 | (32–36) | 400 | (328–502) |
| L(−)1,α,α-trimethyl-2-piperidyl-carbinol diphenylacetate | 26.3 | (24–29) | 250 | (201–273) |
| 1,α,α-trimethyl-2-piperidyl-carbinol diphenylacetate | 29 | (24–35) | 288 | (253–336) |
| Lidocaine | 39.9 | (34–46) | 311 | (288–336) |

1,α,α - trimethyl - 2-piperidylcarbinol diphenylacetate, when intravenously administered to dogs, is very well tolerated at the dose of 5 mg./kg. At a dose of 10 mg./kg. signs of central excitation appear which however regress within short time (10–15 minutes) without leaving any consequences. The action of the compound on the arterial systemic pressure and on the respiration of animals in narcosis (rats, cats) is moderate and comprises a rapid and transitory pressure fall of hystaminic type starting at doses of 1 mg./kg. rapidly and intravenously administered.

It is clear that D(+)1,α,α-trimethyl-2-piperidyl-carbinol diphenylacetate is less toxic than its racemic base. This decrease of toxicity is particularly evident when the compound is administered by the subcutaneous route.

The following examples illustrate the invention, without limiting it.

EXAMPLE 1

1,α,α-trimethyl-2-piperidylcarbinol diphenylacetate 39.75 g. of α,α-dimethyl-2-pyridylcarbinol (prepared according to Ber. 41, 1908, page 4103) are dissolved in 60 cc. of ethanol, 1 g. of Adams platinum is added. Hydrogenation is carried out in an autoclave at 90° C. and under the pressure of 60 atm. After 4 hours, when the reaction is over, the mass is cooled and filtered. The solvent is evaporated off in vacuo. The remainder is made alkaline with concentrated caustic soda and extracted with ethyl ether. After evaporation of the ether, 25 g. of α,α-dimethyl-2-piperidylcarbinol are distilled in vacuo. The boiling point is 78–80° C. under the pressure of 5 mm. Hg.

11 cc. of 30% formaldehyde solution and 0.7 g. of 10% palladium on charcoal are added to 9.7 g. of the above compound dissolved in 100 cc. of ethanol. Hydrogenation is carried out at 110° C. and under the pressure of 60 atm. After 20 hours, the mass is filtered, the alcohol removed and the remainder distilled in vacuo. The fraction distills between 70 and 75° C. under 2 mm. Hg of pressure is collected to give 6.5 g. of 1,α,α-trimethyl-2-piperidylcarbinol.

3 g. of diphenylacetylchloride are added to 2 g. of the last compound dissolved in 10 cc. of pyridine. After 2 days, the pyridine is evaporated in vacuo, the mass taken up with benzene and washed with a 10% sodium hydroxide solution. The benzene solution is dried and chromatographed on a column of 60 g. of silica gel. By elution 2.5 g. of 1,α,α-trimethyl-2-piperidylcarbinol diphenylacetate are obtained, which on treatment with hydrochloric acid gives the corresponding hydrochloride as a white crystalline powder, soluble in water and ethanol. Melting point: 177° C.

EXAMPLE 2

L(−)1,α,α-trimethyl-2-piperidylcarbinol diphenylacetate 22.6 g. (0.064 mols) of 1,α,α-trimethyl-2-piperidylcarbinol diphenylacetate (racemic base) prepared as described in the Example 1 are dissolved in 313 cc. of isopropanol. To the solution 9.6 g. (0.064 mls.) of D(+)-tartaric acid and 34 cc. of water are added. The mixture is warmed up until complete dissolution has taken place and is then allowed to crystallize slowly in a flask immersed in a bath thermoregulated at 45° C. Transparent rhomboidal crystals of the D(+)-tartrate of L(−)1,α,α-trimethyl-2-piperidylcarbinol diphenylacetate are obtained which melt at 110–112° C., $[\alpha]_D^{20°}=0°\pm0.1$ (c.=1.5% in water). The aqueous solution of the tartrate is made alkaline with 2 N sodium hydroxide. The free base is extracted with diethyl ether (white crystals melting at 76–78° C., $[\alpha]_D^{20°}=-2°$) and treated with a solution of hydrochloric acid in diethyl ether. L(−)1,α,α-trimethyl-2-piperidylcarbinol diphenylacetate hydrochloride is obtained, which, crystallized from benzene, melts at 160–162° C., $[\alpha]_D^{20°}=-11°$ (c.=1% in water).

EXAMPLE 3

D(+)1,α,α-trimethyl-2-piperidylcarbinol diphenylacetate

The mother liquor obtained in Example 2 after the removal of the crystals is dried in vacuo. The residue is dissolved in water, made alkaline to phenolphthalein with 2 N sodium hydroxide and extracted with diethyl ether. The extracts are dried over anhydrous sodium sulphate in vacuo. The amorphous residue is completely dried, weighed and reacted with an equimolecular quantity of L(−)-tartaric acid in isopropanol-water as in Example 2. The solution is allowed to crystallize slowly at 45° C. and transparent rhomboidal crystals of the L(−)tartrate enantiomer of D(+)1,α,α-trimethyl-2-piperidylcarbinol diphenylacetate are obtained melting at 110–112° C., $[\alpha]_D^{20°}=0°\pm0.1$ (c.=1.5% in water). The crystals of L(−) tartrate of D(+)1,α,α - trimethyl - 2-piperidylcarbinol diphenylacetate are dissolved in the smallest possible quantity of water. To the solution thus obtained, 2 N sodium hydroxide are added until an alkaline reaction to phenolphthalein is obtained and the solution is then extracted with diethyl ether. The ether extracts are collected together, dried over anhydrous sodium sulphate and then dried in vacuo. The free base (white crystals melting at 76–78° C., $[\alpha]_D^{20°}=+2°$) is dissolved in anhydrous methanol and to the solution a hydrogen chloride solution in anhydrous diethyl ether is added until an acid reaction with Congo Red is obtained. The product is dried in vacuo, taken up with anhydrous benzene and dried in vacuo. The residual foam, dissolved in the smallest quantity of anhydrous benzene allows to the separation on cooling pf. D(+)1,α,α-trimethyl-2-piperidylcarbinol diphenylacetate hydrochloride which melts at 160–162° C., $[\alpha]_D^{20°}=+11°$ (c.=1% in water).

We claim:

1. D(+)1,α,α-trimethyl-2 - piperidylcarbinol diphenylacetate and its non-toxic pharmaceutically acceptable acid addition salts.

2. D(+)1,α,α-trimethyl-2 - piperidylcarbinol diphenylacetate hydrochloride.

References Cited

Burtner et al., J. Am. Chem. Soc. 69, 630–3 (1947).

Adams et al. (Ed.), Organic Reaction IV, Chapter 3, Emerson, 174–244, pp. 174–5 and 194–5 supplied, John Wiley, New York, N.Y. (1948).

Morrison et al., Organic Chemistry, 2nd ed., Allyn and Bacon, Inc., Boston, Mass. (1966), pp. 231–2.

HENRY R. JILES, Primary Examiner

G. T. TODD, Assistant Examiner

U.S. Cl. X.R.

260—294.7; 424—267